United States Patent
Yamada et al.

(10) Patent No.: US 7,322,343 B2
(45) Date of Patent: Jan. 29, 2008

(54) FUEL VAPOR STORAGE CANISTER

(75) Inventors: Eiji Yamada, Saitama (JP); Masaru Nakano, Saitama (JP); Masashi Uchino, Saitama (JP); Takahiro Osaki, Saitama (JP)

(73) Assignee: Mahle Filter Systems Japan Corporation, Tokyo (JP)

( * ) Notice: Subject to any disclaimer, the term of this patent is extended or adjusted under 35 U.S.C. 154(b) by 0 days.

(21) Appl. No.: 11/605,346

(22) Filed: Nov. 29, 2006

(65) Prior Publication Data

US 2007/0119306 A1 May 31, 2007

(30) Foreign Application Priority Data

Nov. 30, 2005 (JP) ............... 2005-344970

(51) Int. Cl.
*F02M 33/04* (2006.01)
*F02M 33/02* (2006.01)

(52) U.S. Cl. ...................... 123/519; 123/520

(58) Field of Classification Search ............... 123/519, 123/520, 516, 198 D
See application file for complete search history.

(56) References Cited

U.S. PATENT DOCUMENTS

| | | | | |
|---|---|---|---|---|
| 4,308,840 A | * | 1/1982 | Hiramatsu et al. ........... | 123/519 |
| 6,460,516 B2 | * | 10/2002 | Kimoto et al. ............... | 123/519 |
| 6,874,483 B2 | * | 4/2005 | Zuchara ....................... | 123/519 |
| 7,008,470 B2 | * | 3/2006 | Makino et al. ................ | 96/131 |
| 7,047,952 B1 | * | 5/2006 | Yamauchi et al. ........... | 123/519 |
| 2002/0020398 A1 | * | 2/2002 | Kimoto et al. ............... | 123/519 |
| 2005/0172938 A1 | * | 8/2005 | Uchino et al. ............... | 123/519 |

FOREIGN PATENT DOCUMENTS

JP 2005-023835 1/2005

* cited by examiner

*Primary Examiner*—Mahmoud Gimie
(74) *Attorney, Agent, or Firm*—Foley & Lardner LLP

(57) ABSTRACT

A fuel vapor storage canister for an automotive vehicle, includes a casing formed thereinside with charge, purge and drain ports connected to a gas passage. First, second, third and fourth adsorption layers are disposed in the gas passage and arranged in order of first, second, third and forth adsorption layers from side of the charge port along a longitudinal direction of the gas passage. Each adsorption layer includes a fuel vapor adsorbent. Additionally, a first space section is formed between the first and second adsorption layers. A second space section is formed between the second and third adsorption sections. A third space section is formed between the third and fourth adsorption sections. Each space section has a width in the longitudinal direction of the gas passage.

6 Claims, 3 Drawing Sheets

FUEL VAPOR STORAGE CANISTER

BACKGROUND OF THE INVENTION

This invention relates to improvements in a fuel vapor storage canister as a fuel vapor treatment device for treating fuel vapor generated, for example, from a fuel tank of an automotive vehicle.

Hitherto a fuel vapor storage canister as a fuel vapor treatment device has been generally used in order to suppress release of fuel vapor generated within a fuel tank to atmospheric air in a gasoline-fueled automotive vehicle, as disclosed in Japanese Patent Provisional Publication No. 2005-23835. This canister includes a casing formed thereinside a gas passage which is filled with a fuel vapor adsorbent such as activated carbon. Charge and purge ports for fuel vapor are provided at one end of the gas passage, while a drain port for fuel vapor is provided at the other end of the gas passage. During stopping of the vehicle, fuel vapor generated from the fuel tank is introduced into the canister and adsorbed by the adsorbent. During operation of an engine, atmospheric air is introduced through the drain port so as to purge fuel vapor adsorbed in the adsorbent and supply the purged fuel vapor to an intake system of the engine through the purge port so that the supplied fuel vapor is combusted and treated within the engine, thus accomplishing a so-called purging. With such purging, a fuel vapor adsorbing performance of the canister can be revived thereby allowing the adsorbent to repeatedly adsorb fuel vapor.

In recent years, environmental protection regulations have become more strict, and therefore a performance improvement is desired for the canister. In order to attain the performance improvement of the canister, it is effective to improve a purging efficiency for fuel vapor during the above purging. Regarding the purging efficiency, important factors for lowering the purging efficiency are a temperature lowering of activated carbon during the purging, and non-uniformization of flow of purge gas or air throughout the cross-sectional area of the gas passage. Accordingly, in order to improve the purging efficiency, it is effective to solve or improve the important factors.

Additionally, other measures for improving the purging efficiency include enlarging a ratio L/D (the length L of the gas passage/the diameter D of the gas passage), and minimizing the volume of a part of the gas passage which part is near the drain port, thereby increasing the amount of the purge air per unit volume. With this, fuel vapor which cannot be trapped at an upstream part on the charge port side can be effectively trapped by a downstream part on the drain port side during charging of fuel vapor.

In order to accomplish such improvements in purging efficiency, in the canister as disclosed in the above Japanese Patent Provisional Publication, the gas passage is arranged including two longitudinal direction passages formed along a casing longitudinal direction, and a U-turn passage for connecting the ends of both the longitudinal direction passages in order to ensure a sufficient length of the gas passage within a compact casing. Additionally, the longitudinal direction passage on the side of the charge and purge ports is formed with one activated carbon layer (adsorption layer) including activated carbon, while the longitudinal direction passage on the side of the drain port or downstream side is formed with two activated carbon layers between which a spacer (or diffusion-retarding cartridge) is interposed thereby reducing the volume of the adsorption layer near the drain port so as to increase a purge air amount per unit volume.

SUMMARY OF THE INVENTION

Since adsorption and desorption of fuel vapor to the adsorbent are carried respectively on exothermic and endothermic reactions accompanying a temperature change, it is required to suppress a temperature rise during the adsorption and a temperature lowering during the desorption in order to maintain good adsorbing and desorbing performances of the adsorbent. However, in the above-discussed conventional canister, there is a tendency that the cross-sectional area, length and volume of the gas passage increase in the adsorption layer particularly on the side of the charge and purge ports or upstream side. Accordingly, heat from the outside is difficult to be transmitted to an inner or deep section of the adsorption layer, and therefore heat tends to stay at the inner section of the adsorption layer. Thus, there arises a problem that a temperature change during the fuel vapor adsorption and desorption cannot be reduced or cancelled. Additionally, if the cross-sectional area and length of the adsorption layer increases, the purge gas is difficult to flow to the outer peripheral section of the gas passage on a cross-sectional plane perpendicular to the axis of the gas passage, thereby ununiformizing the flow of gas in the gas passage throughout the cross-sectional plane. This will lower the purging efficiency of the canister.

It is an object of the present invention to provide an improved fuel vapor storage canister which can effectively overcome drawbacks encountered in conventional fuel vapor storage canisters of the similar nature.

Another object of the present invention is to provide an improved fuel vapor storage canister which can effectively suppress a lowering in fuel vapor adsorption and desorption efficiencies of the canister due to a temperature change.

A further object of the present invention is to provide an improved fuel vapor storage canister in which a temperature change in the individual adsorption layer is softened, while a heat transmission between adjacent adsorption layers can be sharply reduced.

According to the present invention, a fuel vapor storage canister comprises a casing formed thereinside with a gas passage having first and second ends which are opposite to each other. The casing has charge and purge ports for fuel vapor, the charge and purge ports being connected to the first end of the gas passage, and a drain port connected to the second end of the gas passage and opened to atmospheric air. At least first, second, third and fourth adsorption layers are disposed in the gas passage and arranged in order of first, second, third and forth adsorption layers from side of the charge port along a longitudinal direction of the gas passage, each adsorption layer including a fuel vapor adsorbent. Additionally, members are provided to define first, second and third space sections. The first space section is formed between the first and second adsorption layers. The second space section is formed between the second and third adsorption sections. The third space section is formed between the third and fourth adsorption sections. Each space section has a width in the longitudinal direction of the gas passage.

DETAILED DESCRIPTION OF THE INVENTION

Figure 1:
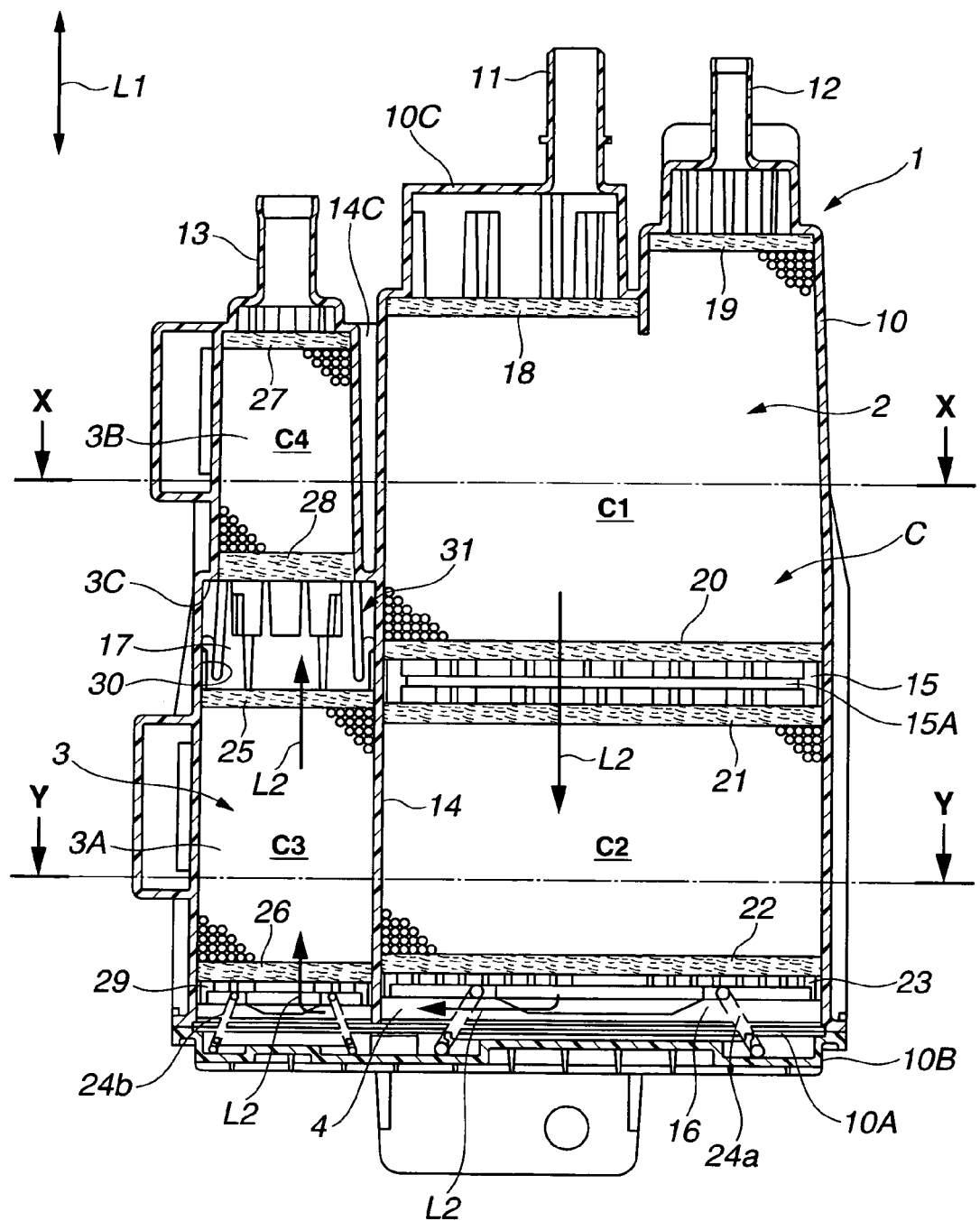
FIG. 1 is a vertical cross-sectional view of an embodiment of a fuel vapor storage canister according to the present invention.
Figure 2:
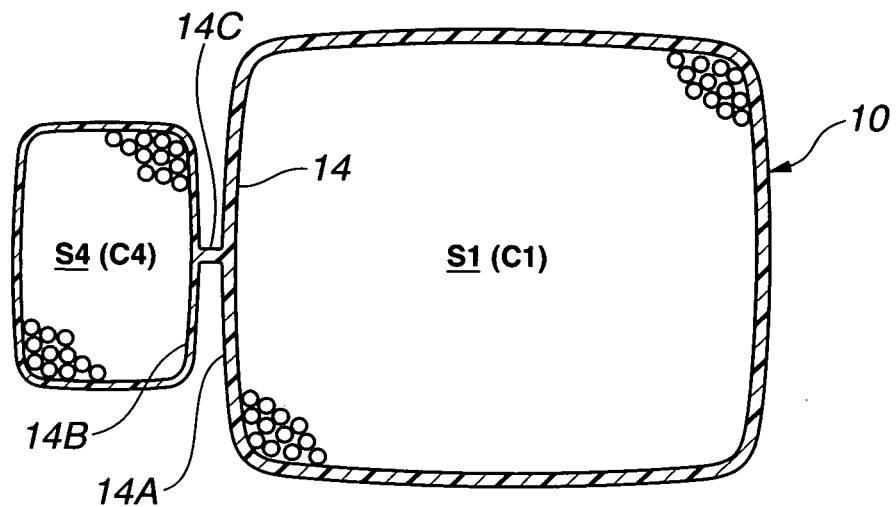
FIG. 2 is a transverse cross-sectional view taken in the direction of arrows substantially along the line X-X of FIG. 1.
Figure 3:
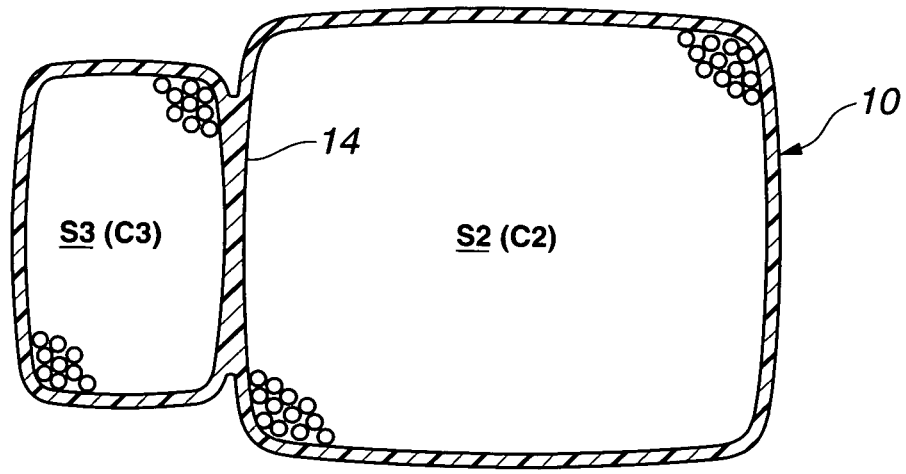
FIG. 3 is a transverse cross-sectional view taken in the direction of arrows substantially along the line Y-Y of FIG. 1.

Referring now to FIGS. 1, 2 and 3 of the drawings, an embodiment of a fuel vapor storage canister according to the present invention is illustrated. The canister comprises a casing 1 as a main body, formed of a resin material or plastic. The casing 1 includes a generally cup-shaped casing main body 10, and a plate-shaped bottom lid section 10B which is joined and fixed to the end face of an open end section 10A of the casing main body 10 in such a manner as to close the open end section 10A formed opening at one end in a longitudinal or vertical direction L1 of the casing 1 (i.e., a vertical direction in FIG. 1, or a direction in which a port wall section 10C discussed after and the bottom lid section 10B face each other). The casing main body 10 has the port wall section 10C which is opposite to the open end section 10A. The port wall section 10C is formed with a charge port 11 which is connected to a fuel tank through a piping (not shown), a purge port 12 which is connected to an intake system of an engine through a piping (not shown), and a drain port 13 which is communicated with atmospheric air. All these ports 11, 12, 13 are formed respectively in pipes which project from the port wall section 10C along the casing longitudinal direction L1. Accordingly, during assembly of the canister to a vehicle body, pipings are installed to the pipes defining the ports from one direction, so that the canister is excellent in vehicle mounting characteristics and assembly characteristics.

A continuous gas passage C through which gas flows is formed inside the casing main body 10. The above-mentioned charge port 11 and purge port 12 are formed at an end portion of an upstream side of this gas passage C. The drain port 13 is formed at an end portion of a downstream side of this gas passage C. In the casing 1, a partition wall section 14 is formed integral with the casing main body 10 and extends from the port wall section 10C to the vicinity of the bottom lid section 10B along the casing longitudinal direction L1. This partition wall section 14 define first and second longitudinal direction passages 2, 3 extending along the casing longitudinal direction L1, and a U-turn passage 4 connecting the lower ends of the both longitudinal direction passages 2, 3. In other words, the passages 2, 3, 4 constitutes a generally U-shaped passage structure which is turned up with the U-shaped passage 4, allowing a long passage to be formed in a compact box or casing. The charge port 11 and the purge port 12 are communicated with the first longitudinal direction passage 2, while the drain port 13 is communicated with the second longitudinal direction passage 3. In connection with a small-diameter section C4 which will be discussed after, as shown in FIG. 2, the partition wall section 14 includes a wall portion 14A defining the first longitudinal direction passage 2, and a wall portion 14B defining the small-diameter section C4. A rib 14C is provided to integrally connect the wall portions 14A, 14B.

In the gas passage C, first to fourth (four) adsorption layers (or activated carbon layers) C1, C2, C3, C4 are arranged in the order mentioned from the side (or upstream side) of the charge and purge ports 11, 12 along a passage (gas passage C) longitudinal or axial direction L2. Additionally, first, second and third space section 15, 16, 17 are formed, in which each space section is located between the two adjacent adsorption layers and has a certain width or dimension in the passage longitudinal direction L2 (or main direction in which gas flows in the gas passage) as a lengthwise direction of the gas passage C. Two screens or filters 18 (19), 20; 21, 22; 25, 26; 27, 28 are disposed on the opposite sides of each adsorption layers C1, C2, C3, C4 in the passage longitudinal direction L2 to prevent activated carbon from getting out of the adsorption layer. In other words, each of the first, second, third and fourth adsorption layer C1, C2, C3, C4 is formed such that filled activated carbon is tightly kept between the screens 18 (19), 20; 21, 22; 25, 26; 27, 28 in the passage longitudinal direction L2.

In the first longitudinal direction passage 2, a first adsorption layer C1 on the charge and purge ports side and a second adsorption layer C2 are disposed in series along the casing longitudinal direction L1 and located such that the first space section 15 is interposed between the first and second adsorption layers C1, C2. In the U-turn passage 4, the second space section 16 is formed between the second adsorption layer C2 and a third adsorption layer C3. In the second longitudinal direction passage 3, the third adsorption layer C3 and the fourth adsorption layer C4 on the drain port side are disposed in series in the casing longitudinal direction L1 and located such that a third space section 17 is interposed between the third and fourth adsorption layers C3, C4.

In order to keep the first space section 15 having a certain distance between the adjacent adsorption layers, a first spacer 15A is interposed between the first adsorption layer C1 and the second adsorption layer C2. The screen 20 is disposed between the first spacer 15A and the first adsorption layer C1. The screen 21 is disposed between the first spacer 15A and the second adsorption layer C2. In order to keep the third space section 17 constant, the second spacer 31 is interposed between the third adsorption layer C3 and the fourth adsorption layer C4. The screen 25 is interposed between the second spacer 31 and the third adsorption layer C3. The screen 28 is interposed between the second spacer 31 and the fourth adsorption layer C4. The spacers 15A, 31 are formed of a synthetic resin (plastic) or the like which has an excellent thermal deformation resistance and has a thermal non-flexibility so that the spacer cannot make its dimensional change particularly in the casing longitudinal direction L1 even upon being thermally affected from the adsorption (activated carbon) layers. Additionally, the spacers 15A, 31 are set to secure the space sections 15, 17 each of which has a sufficient space volume between the adjacent adsorption layers. The dimension of each space section 15, 17 in the passage longitudinal direction L2 is set to be not less than 10 mm.

Around the U-turn passage 4, the screen 22, a grid 23 and a first return spring 24a are disposed between the second adsorption layer C2 and the bottom lid section 10B. Additionally, the screen 26, a grid 29 and a second return spring 24b are disposed between the third adsorption layer C3 and the bottom lid section 10B. A second space section 16 having a certain volume is formed between the grid 23, 29 and the bottom lid section 10B under the biasing force of the return spring 24a, 24b. The screen 22, 26 and the grid 23, 29 are in contact with each other. The first return spring 24a is interposed in a compressed state between the grid 23 and the bottom lid section 10B, in which the grid is plate-shaped and formed with a plurality of air passage holes so as to have an air permeability. The second return spring 24b is interposed in a compressed state between the grid 29 and the bottom lid section 10B, in which the grid is plate-shaped and formed with a plurality of air passage holes so as to have an air permeability.

The first longitudinal direction passage 2 has the same cross-sectional shape throughout its whole length. Accordingly, the grid 23, the screens 20, 21, 22 and the first spacer 15A fitted within the first longitudinal direction passage 2 are movable and displaceable along the casing longitudinal direction L1 within the first longitudinal direction passage 2. The second longitudinal direction passage 3 includes a large-diameter section 3A accommodating therein the third adsorption layer C3, and a small-diameter section 3B which is smaller in passage cross-sectional area than the large-diameter section 3A and accommodates therein the fourth adsorption layer C4. The passage cross-sectional area is a cross-sectional area of each adsorption layer C1, C2, C3, C4, perpendicular to the passage longitudinal direction L2. An annular step portion 3C of the casing 10 is formed between the large and small diameter sections 3A, 3B so as to curve in the casing longitudinal direction L1. The step portion 3C has an inner peripheral surface facing the side of the bottom lid section 10B. The screen 28 interposed between the second spacer 31 and the adsorption layer C4 is formed of a flexible material such as polyurethane foam or the like which is air-permeable and flexible. The screen 28 is fitted in the small-diameter section 3B and interposed between the end face of the fourth adsorption layer C4 and the end face of the second spacer 31, in the state of being compressed in the casing longitudinal direction L1.

Figure 4:
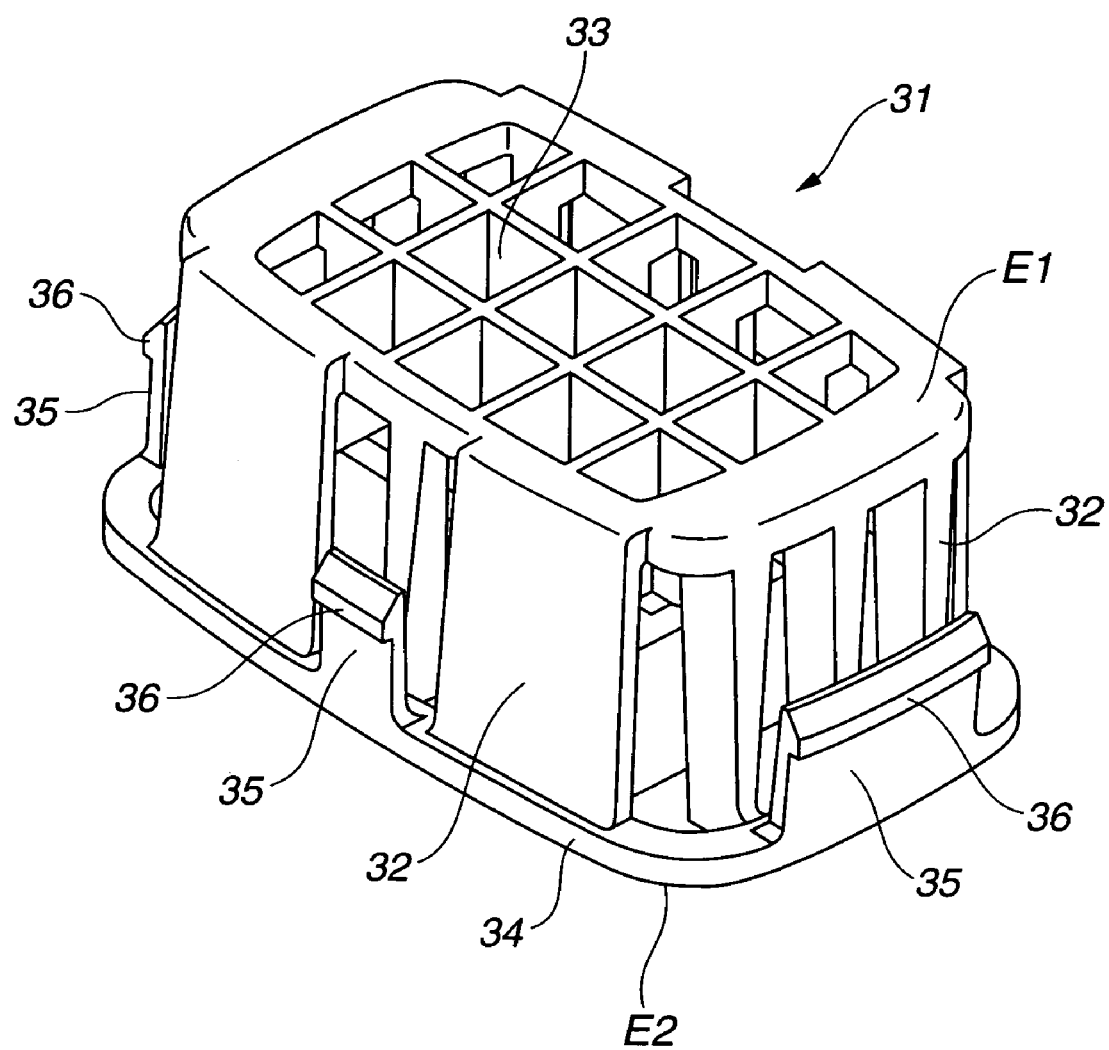
FIG. 4 is a perspective view of a second spacer used in the canister of FIG. 1.

The second spacer 31 is inserted from the open end section 10A into the second longitudinal direction passage 3 toward the port wall section 10C during production of the canister, so as to be fitted to a wall defining the second longitudinal direction passage 3 in a state where its movement toward the open end section 10A is restrained thereby constituting a so-called snap-fit type installation and fixation structure as a snap-fit means or device. Specifically, as shown in FIG. 4, the second spacer 31 of the generally rectangular parallelopiped shape takes a frame-shaped structure and has four side walls 32 which are integral with each other. A grid-like structure (no numerals) is integrally formed within the four side walls 32 so as to form a plurality of gas passages 33 which extends from one or upper end section E1 to an opposite or lower end section E2 of the second spacer 31. The first end section E1 has a size (in length and width) larger than that (in length and width on a cross-sectional plane perpendicular to the axis of the passage 3) of the small-diameter section 3B and smaller than that (in length and width on the cross-sectional plane) of the large-diameter section 3A, so that the first end section E1 is well brought into contact with the inner peripheral surface of the step portion 3C during assembly of the canister. A flange portion 34 is formed at the second end section E2 of the second spacer 31 in such a manner as to project outwardly over the side walls 32 and peripherally extend. The peripherally extending flange portion 34 includes four flanges corresponding to the four side walls 32 and integral with each other. Four engaging piece sections 35 are integrally formed respectively on the four flanges and vertically extend along the side walls 32. Each engaging piece section 35 is tongue-like and flexible, and is provided at its free end with a claw portion 36 which projects outwardly to form a hook-like part. In this connection, beads 30 are formed at an inner wall surface defining the second longitudinal direction passage 3 so as to be respectively caught by the claw portions 36 so that each engaging piece section 35 is engaged with the corresponding bead 30.

During production of the canister, in a condition where the casing main body 10 to which the bottom lid section 10B has not yet installed is located such that its open end section 10A is opened upward, the screens, spacers, the grids, and activated carbon (adsorbent) and the return springs are successively inserted and assembled within the casing main body 10. Finally, the bottom lid section 10B is joined to the end face of the open end section 10A. For example, within the second longitudinal direction passage 3, first the screen 27 is assembled, and then activated carbon forming the fourth adsorption layer C4 is filled, and subsequently the flexible material serving as the screen 28 is inserted through the open end section 10A and assembled. In a condition immediately after assembly of this flexible material as the screen 28, the flexible material having a flexibility is in its state of free length or height, so that a part of the flexible material projects over the inner peripheral surface of the step portion 3C into the large-diameter section 3A, taking account of a volume required for sealing. Next, the second spacer 31 is inserted through the open end section 10A and pushed in toward the port wall section 10C, so that the flexible material as the screen 28 is compressed. When the second spacer 31 is further pushed in, the claw portion 36 of the engaging piece section 35 gets over the bead 30 and is brought into engagement with the bead 30 while the main body of the engaging piece section 35 bends, so that the second spacer 31 is fixed to the casing main body 10. In this fixed condition, the second spacer 31 receives a compression-repulsion from the elastic material as the screen 28, and therefore the claw portions 36 of the engaging piece sections 35 are securely engaged with the beads 30. Accordingly, the second spacer 31 is stably fixed at a certain position without moving in the casing longitudinal direction L1.

Referring to FIGS. 2 and 3, the passage cross-sectional areas S1, S2, S3, S4 of the respective first, second, third and fourth adsorption layers C1, C2, C3, C4 are set to be equal or become smaller in the order mentioned or in the order of from the upstream side to the downstream side in flow of gas supplied through the charge port 11. Specifically, the first longitudinal direction passage 2 is set to have the same passage cross-sectional area throughout the almost whole length, so that the passage cross-sectional area S1 of the first adsorption layer C1 and the passage cross-sectional area S2 of the second adsorption layer C2 in the first longitudinal direction passage 2 are set to be generally equal. A ratio (S2:S3) between the passage cross-sectional area S2 of the second adsorption layer C2 and the passage cross-sectional area S3 of the third adsorption layer C3 on the downstream side of the second adsorption layer C2 is generally 3:1. In other words, the passage cross-sectional areas S1, S2 of the first and second adsorption layers C1, C2 are set at about three times of the passage cross-sectional area S3 of the third adsorption layer C3. The passage cross-sectional area S4 of the fourth adsorption layer C4 is set to be smaller than the passage cross-sectional area S3 of the third adsorption layer C3. In this embodiment, the fourth adsorption layer C4 has a volume of about 100 cc, in which a ratio L (length)/D (width or diameter) is set to be not less than 1.

The fourth adsorption layer C4 located nearest the drain port 13 is set to have cross-sectional area and volume smaller than those of other adsorption layers C1, C2, C3, so that a purge bed volume (BV) or ratio of an amount of air flowing through this layer to an amount of activated carbon is set to be large. As a result, even in case that the amount of air flowing through the layer is small, desorption or purging of fuel vapor can be securely accomplished in the adsorption layer C4, thereby securely preventing fuel vapor from being released through the drain port 13. Although this fourth adsorption layer C4 is high in air flow resistance during purging of fuel vapor owing to its small cross-sectional area, such a high air flow resistance can be suppressed to a negligible level by separating the fourth adsorption layer C4 from the third adsorption layer C3 so as to sufficiently reduce the volume and passage length of the fourth adsorption layer C4.

With the above fuel vapor storage canister, fuel vapor generated in the fuel tank during stopping of the vehicle is introduced through charge port 11 into the inside of casing 1 and flows in the passage longitudinal direction L2 in the order of the first, second, third and fourth adsorption layers C1, C2, C3, C4 in the gas passage C. At this time, fuel component of fuel vapor is adsorbed by activated carbon in the adsorption layers C1, C2, C3, C4 while the remaining air is released through the drain port 13 into atmospheric air. During operation of the engine of the vehicle, atmospheric air is introduced through the drain port 13 into casing 1 and passes through activated carbon in the adsorption layers C1, C2, C3, C4, and then sucked through purge port 12 into the engine. At this time, fuel (component) adsorbed in activated carbon is desorbed or purged under the action of air flow, and then is introduced through purge port 12 into the engine together with air so as to be combusted in the engine.

Next, technical ideas and effects featured by the present invention will be enumerated. It will be understood that the present invention is not limited to the arrangement of the embodiment to which reference numerals are attached in the figure, and therefore include various modifications and changes. For example, the number of the adsorption layers dividedly formed in the gas passage is not limited to four, and therefore may be not less than five.

(1) The charge port 11 and the purge port 12 for fuel vapor are provided at an end of the gas passage C formed inside the casing 1, while the drain port 13 opened to atmospheric air is provided at the other end of the gas passage C. In the gas passage C, at least four, i.e., the first, second, third and fourth adsorption layer C1, C2, C3, C4 containing the adsorbent are arranged in the order mentioned from the side of the charge port 11 along the passage longitudinal direction L2, while each of the first, second and third space section 15, 16, 17 is ensured between the adjacent adsorption layers in such a manner as to have a certain depth or dimension in the passage longitudinal direction L2.

Thus, the interior of the gas passage C is divided into at least four adsorption layers along its passage longitudinal direction L2, while the space section 15, 16, 17 is ensured between the adjacent adsorption layers, thereby substantially interrupting the continuity of the adjacent adsorption layers. As a result, a temperature lowering during purging of fuel vapor and a temperature rising during charging of fuel vapor are suppressed under the effect of the volume of the individual adsorption layer, and therefore a temperature change in the individual adsorption layer is softened. Additionally, since the adjacent adsorption layers are thermally divided with the space section, a heat transmission between the adjacent adsorption layers can be sharply reduced, thereby suppressing a temperature change in the whole adsorption layers inside the casing 1. For example, even if the temperature of the first adsorption layer C1 located at the upstream-most side rises with fuel vapor adsorption reaction during charging of fuel vapor thereby lowering the fuel vapor adsorbing ability of the adsorption layer, a temperature rise in the adsorption layers C2, C3, C4 on the downstream side can be suppressed, thus effectively ensuring a good fuel vapor adsorbing ability of the whole canister.

In general, concentration and temperature of gas passing through each adsorption layer are unavoidably different at positions on a cross-sectional plane perpendicular to the axis of the gas passage, for example, at a position near the center in the plane and at a position near the outer periphery in the cross-sectional plane, in which the difference becomes larger as the length of the gas passage becomes longer. However, in the embodiment of the present invention, the space section is secured between the adjacent adsorption layers, and therefore gases passed through the adjacent adsorption layers can be mixed with each other in the space section, so that the concentration and temperature of the passed gases can be uniformized in this space section. Accordingly, as compared with, for example, a case where a space section is not ensured between adjacent adsorption layers so that the adjacent adsorption layers are continuous with each other, the difference in concentration and temperature of the passed gases at the positions on the cross-sectional plane perpendicular to the axis can be softened thereby uniformizing gas adsorption and desorption efficiencies at different positions on the cross-sectional plane perpendicular to the axis. This can also improve the gas adsorbing and desorbing efficiency of the whole canister, and improve the reliability and durability of the canister.

(2) The gas passage C includes the first longitudinal direction passage 2 extending along the casing longitudinal direction L1 and located on the side of the charge port 11 and the purge port 12, the second longitudinal direction passage 3 extending along the casing longitudinal direction L1 and located on the side of the drain port 13, and the U-turn passage 4 connecting the ends of the first and second longitudinal direction passages 2, 3. In the first longitudinal direction passage 2, the first and second adsorption layers C1, C2 are arranged in series and located on the opposite sides of the space section 15. In the U-turn passage 4, the second space section 16 is formed between the second and third adsorption layers C2, C3. In the second longitudinal direction passage 3, the third and fourth adsorption layers C3, C4 are arranged in series and located on the opposite sides of the space section 17.

Thus, the gas passage C within the casing 1 is formed U-shaped to allow fuel vapor to make its U-turn flow, and therefore the gas passage C having a sufficient length can be ensured in the compact casing, while the ratio L(length)/D (width or diameter) of the gas passage C can be set large. All the ports 11, 12, 13 can be formed in one wall section (or the port wall section 10) of the casing 1, so that the canister is excellent in its mountability on a vehicle and in its assembly-operation efficiency. Additionally, in such a passage arrangement of the U-turn shape, the volume and length of the first and second longitudinal direction passages 2, 3 along the casing longitudinal direction L1 are relatively large, which may result in a fear that the fuel vapor adsorption and desorption efficiencies are lowered. However, the inside of the first longitudinal direction passage 2 is divided into the first and second adsorption layers C1, C2 with the first space section 15 so that the both layers C1, C2 are thermally separated from each other, while the inside of the second longitudinal direction passage 3 is divided into the third and fourth adsorption layers C3, C4 so that the both layers C3, C4 are thermally separated from each other. Accordingly, as compared with a case where one adsorption layer is continuously arranged inside a longitudinal direction passage, the difference in concentration and temperature of the passed gases at the different positions on the plane perpendicular to the axis of the gas passage can be effectively suppressed thereby largely improving the fuel vapor adsorbing and desorbing performance of the canister.

(3) The first return spring 24a is provided as a first biasing means to bias the second adsorbing layer C2 to the side of the first adsorption layer C1. The first spacer 15A having a non-flexibility is interposed between the first adsorption layer C1 and the second adsorption layer C2 to keep the first space section 15 at a constant volume. This first spacer 15A is fitted in the first longitudinal direction passage 2 to be movable in the casing longitudinal direction L1.

With such an arrangement, for example, when the adsorbent (activated carbon) wears so that the volume of the first and second adsorption layers C1, C2 reduce, the axial length of the first return spring 24a increases by an amount corresponding to the volume reduction. With this, the first spacer 15A interposed between the first and second adsorption layers C1, C2 moves within the first longitudinal direction passage 2, thereby maintaining both the adsorption layers C1, C2 in a condition where a compressing and biasing force is applied. At this time, the space volume of the first space section 15 can be maintained constant under the action of the first spacer 15A. With such a simple arrangement, the first and second adsorption layers C1, C2 within the first longitudinal direction passage 2 can be maintained at their compressed and biased state, while the volume of the first space section 15 between the both layers C1, C2 can be maintained constant.

(4) The second return spring 24b is provided as a second biasing means to bias the third adsorbing layer C3 to the side of the fourth adsorption layer C4. The second spacer 31 having a non-flexibility is interposed between the third adsorption layer C3 and the fourth adsorption layer C4 and fixed at the axial central portion of the second longitudinal direction passage 3 to keep the third space section 17 at a constant volume. Additionally, the screen or flexible member 28 is interposed between the second spacer 31 and the fourth adsorption layer C4 and in a compressed condition in the casing longitudinal direction L1.

Accordingly, for example, when the adsorbent (activated carbon) wears so that the volume of the third and fourth adsorption layers C3, C4 reduces, the axial length of the second return spring 24b increases by an amount corresponding to the volume reduction thereby maintaining the third adsorption layer C3 at its compressed and biased state with regard to the third adsorption layer C3, while the thickness of the screen or flexible member 28 increases by an amount corresponding to the volume reduction thereby maintaining the fourth adsorption layer C4 at its compressed and biased state. Additionally, regardless of such a volume change in the adsorption layers, the position and space volume of the third space section 17 can be kept constant under the action of the second spacer 31.

(5) The second longitudinal direction passage 3 includes the large-diameter section 3A in which the third adsorption layer C3 is disposed, and the small-diameter section 3B smaller in passage cross-sectional area than the large-diameter section 3A, the fourth adsorption layer C4 being disposed in the small-diameter section 3B. The screen or flexible member 28 is fitted inside the small-diameter section 3B, while the second spacer 31 is fitted inside the large-diameter section 3A. With this, the passage cross-sectional area and volume of the fourth adsorption layer C4 located nearest the drain port 13 in the plurality of adsorption layers C1 to C4 is reduced thereby increasing the ratio L/D (length/width) and the purge BV (or an amount of air required for purging fuel vapor per unit volume of the adsorption layer), thus improving a fuel vapor purging efficiency of the canister.

(6) The bottom lid section 10B is provided to close the open end section 10A formed to open at one end of the casing 1 in the casing longitudinal direction L1. The snap-fit means or device is provided to allow the second spacer 31 to engage with the wall defining the second longitudinal direction passage 10A in a condition of being restrained in movement toward the open end section 10A by inserting the second spacer 31 through the open end section 10A into the second longitudinal direction passage 3. By using the second spacer of the snap-fit type, various parts including the flexible member 28 and the adsorbent can be assembled by being inserted through the open end section 10A during production of the canister.

(7) In order to improve fuel vapor adsorbing and desorbing efficiencies while preventing fuel vapor from being released through the drain port, the passage cross-sectional areas S1, S2, S3, S4 of the respective first, second, third and fourth adsorption layer C1, C2, C3, C4 are set to be equal or become smaller in the order mentioned or in the order of from the upstream side to the downstream side in flow of gas supplied through the charge port 11. In concrete terms, the passage cross-sectional area Si of the first adsorption layer C1 and the passage cross-sectional area S2 of the second adsorption layer S1 in the first longitudinal direction passage 2 are set to be generally equal. The passage cross-sectional area S3 of the third adsorption layer C3 is about ⅓ of the passage cross-sectional area S2 of the second adsorption layer C2. Additionally the passage cross-sectional area S4 of the fourth adsorption layer C4 is set to be smaller than the passage cross-sectional area S3 of the third adsorption layer C3.

As appreciated from the above, according to the present invention, at least the four adsorption layers are arranged along the passage longitudinal direction within the gas passage, while each space section is formed between the adjacent adsorption layers. As a result, the temperature lowering during purging of fuel vapor and the temperature rising during charging of fuel vapor are suppressed under the effect of the volume of the individual adsorption layer, and therefore the temperature change in the individual adsorption layer is softened. Additionally, since the adjacent adsorption layers are thermally divided with the space section, the heat transmission to the adjacent adsorption layer can be sharply reduced, thereby reducing the fuel vapor adsorption and desorption efficiency due to a temperature change can be lightened. Additionally, in general, the concentration and temperature of gas passing through each adsorption layer are unavoidably different at various positions on the cross-sectional plane perpendicular to the axis of the gas passage, for example, at the position near the center in the cross-sectional plane and at the position near the outer periphery in the plane, in which the difference becomes larger as the length of the gas passage becomes longer. In the embodiment of the present invention, the space section is secured between the adjacent adsorption layers, and therefore gases passed through the adjacent adsorption layers can be mixed with each other in the space section, so that the concentration and temperature of the passed gases can be uniformized in this space section. Accordingly, as compared with, for example, a case where a space section is not ensured between adjacent adsorption layers so that the adjacent adsorption layers are continuous with each other, the difference in concentration and temperature of the passed gases at the different positions on the cross-sectional plane perpendicular to the axis can be softened thereby uniformizing gas adsorption and desorption efficiencies at different positions on the plane perpendicular to the axis. This can also improve the gas adsorbing and desorbing efficiency of the whole canister, and improve the reliability and durability of the canister.

The entire contents of Japanese Patent Application No. 2005-344970, filed Nov. 30, 2005, are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A fuel vapor storage canister comprising:
   a casing formed thereinside with a gas passage having first and second ends which are opposite to each other, the casing having charge and purge ports for fuel vapor, the charge and purge ports being connected to the first end of the gas passage, and a drain port connected to the second end of the gas passage and opened to atmospheric air;
   at least first, second, third and fourth adsorption layers which are disposed in the gas passage and arranged in order of first, second, third and forth adsorption layers from a side of the charge port along a longitudinal direction of the gas passage, each adsorption layer including a fuel vapor adsorbent; and
   members for defining first, second and third space sections, the first space section being formed between the first and second adsorption layers, the second space section being formed between the second and third adsorption sections, the third space section being formed between the third and fourth adsorption sections, each space section having a dimension in the longitudinal direction of the gas passage,
   wherein the charge port of the casing is located such that the first adsorption layer is the adsorption layer first charged with fuel vapor from the charge port during charging of fuel vapor in the fuel vapor storage canister through the charge port.

2. A fuel vapor storage canister as claimed in claim 1,
   wherein the gas passage includes a first longitudinal direction passage located on the side of the charge port and extending along a longitudinal direction of the casing, a second longitudinal direction passage located on a side of the drain port and extending along the casing longitudinal direction, and a U-turn passage connecting an end of the first longitudinal direction passage and an end of the second longitudinal direction passage,
   wherein the first and second adsorption layers are arranged in series in the first longitudinal direction passage, the first space section being interposed between the first and second adsorption layers,
   wherein the third and fourth adsorption layers are arranged in series in the second longitudinal direction passage, the third space section being interposed between the third and fourth adsorption layers, and
   wherein the second space section is formed in the U-turn passage and interposed between the second and third adsorption layers.

3. A fuel vapor storage canister as claimed in claim 2,
   wherein the second longitudinal direction passage includes a large-diameter section in which the third adsorption layer is disposed, and a small-diameter section in which the fourth adsorption layer is disposed, the small-diameter section being smaller in cross-sectional area on a plane perpendicular to an axis of the second longitudinal direction passage, than the large-diameter section, and
   wherein the fuel vapor storage canister further comprises:
     a first biasing device for biasing the second adsorbing layer to a side of the first adsorption layer;
     a non-flexible first spacer interposed between the first adsorption layer and the second adsorption layer and fitted in the first longitudinal direction passage to be movable in the casing longitudinal direction so as to maintain the first space section constant;
     a second biasing device for biasing the third adsorption layer to a side of the fourth adsorption layer;
     a non-flexible second spacer interposed between the third and fourth adsorption layers and fitted and fixed within the large-diameter section so as to maintain the third space section constant; and
     a flexible member interposed between the second spacer and the fourth adsorption layer and having an air-permeability and flexibility, the flexible member being fitted within the small-diameter section in a condition of being compressed in the casing longitudinal direction.

4. A fuel vapor storage canister as claimed in claim 3, further comprising:
   a bottom lid section for closing an open end section which is formed at an end of the casing in the casing longitudinal direction; and
   a snap-fit device for allowing the second spacer to engage with a wall defining the second longitudinal direction passage in a condition of being restrained in movement in the casing longitudinal direction.

5. A fuel vapor storage canister as claimed in claim 1, wherein each space section extends throughout a plane perpendicular to the gas passage longitudinal direction, the plane being defined by an inner periphery of the casing.

6. A fuel vapor storage canister as claimed in claim 1, wherein the first, second, third and fourth adsorption layers and the drain port are arranged such that fuel vapor from the charge port flows in order of the first adsorption layer, the second adsorption layer, the third adsorption layer, the fourth adsorption layer and the drain port during the charging of fuel vapor in the fuel vapor storage canister through the charge port.

* * * * *